United States Patent [19]

Greigger et al.

[11] Patent Number: 4,609,717

[45] Date of Patent: Sep. 2, 1986

[54] HIGH SOLIDS COATING COMPOSITIONS BASED ON LONG CHAIN DIOLS

[75] Inventors: Barbara A. Greigger, Allison Park; Rostyslaw Dowbenko, Gibsonia, both of Pa.

[73] Assignee: PPG Industries, Inc., Pittsburgh, Pa.

[21] Appl. No.: 719,660

[22] Filed: Apr. 3, 1985

[51] Int. Cl.[4] .................... C08G 63/76; C08G 65/48
[52] U.S. Cl. .................................... 528/45; 525/124; 525/131; 525/386; 528/66; 528/76; 528/110; 528/254; 528/297; 528/301; 528/354; 528/405; 560/185; 560/189; 568/679
[58] Field of Search ............... 525/386, 124, 131; 528/45, 66, 76, 110, 254, 297, 301, 354, 405; 560/185, 189; 568/679

[56] References Cited

U.S. PATENT DOCUMENTS

| | | | |
|---|---|---|---|
| 2,890,208 | 6/1959 | Young et al. | 528/354 X |
| 3,336,242 | 8/1967 | Hampson et al. | 260/2.5 |
| 3,730,936 | 5/1973 | Bugmann | 260/37 N |
| 3,795,701 | 3/1974 | Jenkins et al. | 260/484 A |
| 4,101,603 | 7/1978 | Smith et al. | 260/850 |
| 4,163,029 | 7/1979 | Smith et al. | 528/354 X |
| 4,314,918 | 2/1982 | Birkmeyer et al. | 260/20 |
| 4,465,877 | 8/1984 | Edwards | 568/618 |

*Primary Examiner*—Earl Nielsen
*Attorney, Agent, or Firm*—William J. Uhl

[57] ABSTRACT

High solids coating compositions which comprise the reaction product of an aliphatic diol having a chain length between hydroxyls of greater than $C_{10}$ and a reactant selected from the class consisting of lactones, epoxides and mixtures thereof are disclosed. The reaction products along with a suitable curing agent may be used as the principal resinous binders in the coating composition or may be used as reactive diluents.

13 Claims, No Drawings

HIGH SOLIDS COATING COMPOSITIONS BASED ON LONG CHAIN DIOLS

BACKGROUND OF THE INVENTION

Field of the Invention: The present invention is in the field of coating compositions, more particularly to high solids coating compositions.

Brief Description of the Prior Art: Governments in many countries including the United States are requiring the coatings industry to develop coating compositions which emit low amounts of organic material upon curing. Formerly, coating compositions were formulated with high molecular weight organic polymers. Although these polymers provided coatings with good physical and chemical properties, they were viscous and required considerable thinning with volatile organic solvents for good handling and application properties. Upon curing, these solvents would volatilize being emitted to the atmosphere where they posed environmental health problems.

In response to governmental pressure to solve these problems, the coatings industry has developed water-based and high solids organic coating compositions. The high solids compositions are made with low molecular weight organic polymers in combination with curing agents. These compositions are fluid and do not require much thinning with volatile organic solvents. The coatings can be applied at relatively high percentage resin solids which minimizes the amount of volatile organic solvent which is emitted to the atmosphere during curing.

One method of formulating high solids coating compositions is to use so-called "reactive diluents" which are capable of thinning the coating composition yet are reactive with a curing agent so as to become part of the cured film. An example of a reactive diluent is the reaction product of a glycidyl ester such as the glycidyl ester of Versatic acid with a hydroxy and/or carboxy functional compound as described in U.S. Pat. No. 4,314,918 to Birkmeyer et al.

SUMMARY OF THE INVENTION

The present invention relates to coating compositions comprising the reaction product of an aliphatic diol having a chain length between the hydroxyl groups of greater than $C_{10}$ and a reactant selected from the class consisting of lactones, epoxides and mixtures thereof. The reaction product along with a suitable curing agent can be the sole resinous ingredients of the coating composition or the reaction product can be present as a reactive diluent.

Aliphatic diols having a chain length greater than $C_{10}$ are not readily available. Usually to get chains of this length, ether or ester linkages within the chain are required, for example, ether diols and ester diol oligomers. Formulating coating compositions with these ether and ester diols can cause problems in the resultant coating in that the ester linkages are subject to hydrolysis and the ether linkages are sensitive to UV light. The aliphatic diols of the present invention with a hydrocarbon chain length of greater than $C_{10}$ do not have groups which are susceptible to this type of attack.

DETAILED DESCRIPTION

The aliphatic diols which are used in the practice of the present invention have a hydrocarbon chain length of greater than 10 carbon atoms between hydroxyl groups and preferably a chain length on average of 14 carbon atoms. Preferably, the aliphatic group is saturated and contains only carbon and hydrogen. The aliphatic diol would have a structure of the formula:

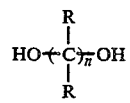

where R is selected from the class consisting of hydrogen and lower alkyl containing from 1 to 3 carbon atoms with hydrogen being preferred, and n is a number on average of greater than 10, preferably 10-20, and more preferably on the average of about 14 carbon atoms. Examples of suitable aliphatic diols are 1,10-decane diol, 1,12-dodecane diol and 1,16-hexadecane diol. A preferred aliphatic diol is a material commercially available from Sartomer Company as SR-100 diol which is a long chain mixture consisting primarily of aliphatic diols and monofunctional alcohols having an average chain length of approximately $C_{14}$.

The long chain diols are reacted with lactones and/or epoxides to build the molecular weight and make reaction products suitable for use as resinous binders in coating compositions and also suitable for use as reactive diluents. The long chain diols themselves are crystalline and reaction with the lactone or the epoxide breaks up the undesirable crystallinity. The lactone may be any lactone or a combination of lactones having at least 4 carbon atoms, for example, from 4 to 8 carbon atoms in the ring. The lactone used as the starting material can be represented by the following structural formula:

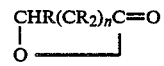

where n is at least 2 and preferably from 2 to 6, and at least (n+2) R's are hydrogen and the remaining R substituents are selected from the group consisting of hydrogen, alkyl, cycloalkyl and alkoxy, none containing more than 12 carbon atoms, the total number of carbon atoms and the substituents in the lactone ring not exceeding 12.

The lactones preferred in the practice of the invention are the epsilon-caprolactones in which n equals 4. Most preferred is unsubstituted epsilon-caprolactone in which n equals 4 and all the R's in the above structural formula are hydrogen.

The reaction of the aliphatic diol and the lactone is preferably conducted in an inert atmopshere such as nitrogen. The reaction can be conducted neat or in the presence of an organic solvent such as xylene. The aliphatic diol and the lactone are reacted by simply mixing the two together optionally in the presence of a catalyst such as a tin catalyst, for example, stannous octoate or dibutyltin dilaurate. Catalyst concentrations of about 0.05 to 1 percent by weight are typical. Preferably, the lactone is added incrementally to the diol so as to better control the reaction. The temperature of the reaction is typically between 80° to 180° C. and reaction times will vary between 1 to 24 hours depending somewhat on temperature and catalyst. The molar ratio of lactone to diol is usually from about 1 to 20:1 and preferably within the range of about 2 to 10:1. Ratios greater than 20:1 are undesirable because of high resin viscosity and resultantly soft deposited films, whereas ratios less than 1:1 are undesirable because of crystallinity in the resultant reaction product.

Besides the lactone, the aliphatic diol can also be reacted with an epoxide or a mixture of lactone and an epoxide. Examples of epoxides which are useful are 1,2-epoxides and preferred are monoepoxides. Examples are those represented by the structural formula:

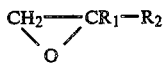

where $R_1$ is hydrogen or methyl, and $R_2$ is hydrogen, alkyl including cycloalkyl, aryl preferably containing from 1 to 18 carbon atoms with aryl containing from 6 to 18 carbon atoms, substituted alkyl and aryl moieties as long as the substituents do not interfere with the reaction of the monoepoxide with the aliphatic diol. Illustrative examples of the monoepoxides are alkylene oxides containing from 2 to 8 carbon atoms including ethylene oxide, propylene oxide, 1,2-butylene oxide, 1,2-pentene oxide, styrene oxide and glycidol. Examples of other suitable materials are glycidyl esters of monobasic acids such as glycidyl ester of versatic acid (CARDURA E, available from Shell Chemical Company), glycidyl ethers of alcohols and phenols such as butyl glycidyl ether and phenyl glycidyl ether.

The aliphatic diol and the epoxide are preferably reacted together in an inert atmosphere such as nitrogen. The reaction is usually conducted neat under pressure or can be conducted neat at atmospheric pressure or in the presence of an organic solvent such as xylene. The aliphatic diol and the epoxide can be reacted by simply mixing the two together. Preferably, the epoxide is added incrementally to the diol so as to better control the reaction and obtain a higher yield of the desired product. The proportions of the aliphatic diol and the epoxide which are reacted together are usually within the molar ratio of 1 to 20:1 and preferably from about 2 to 10:1. Ratios greater than 20:1 are undesirable because of soft, water-sensitive deposited films, whereas ratios less than 1:1 are undesirable because of crystallinity in the resultant reaction product. The temperature of reaction should be at least 80° C. and usually within the range of about 100° to 200° C. A catalyst such as an organophosphine, such as triphenylphosphine, and amine such as triethylamine, and inorganic bases such as potassium hydroxide can be used. When catalyst is used, it is used in amounts of about 0.1 to 2 percent by weight based on total weight of the reactants. The time of reaction depends principally on the pressure and temperature of reaction and the presence or absence of catalyst. In general, reaction times will vary from about 30 minutes to 24 hours. The rate and extent of reaction may be monitored by measuring the decrease in epoxy functionality.

The aliphatic diol can be reacted with both the lactone and the epoxide. The reaction is conducted under the conditions described above with either the lactone or the epoxide and when the reaction is complete, with the remaining reactant. Mole ratios of aliphatic diol:lactone:epoxide are typically within the range of 1:1 to 20:1 to 20, preferably 1:2 to 10:2 to 10.

The preferred aliphatic diol reaction products are characterized by their low viscosity and non-volatile content which makes them well suited for use in high solids coating compositions. They along with a suitable curing agent may constitute the principal resinous vehicle for the coating compositions, i.e., the combined solids of aliphatic diol reaction product plus curing agent being greater than 50 percent by weight based on total resin solids weight. Alternately, the preferred aliphatic diol may be used as reactive diluents with a co-curing active hydrogen-containing resin. The aliphatic diol reaction products preferably have Gardner-Holdt viscosities of less than Z, more preferably less than P. The non-volatile content of the aliphatic diol is preferably greater than 80 and preferably greater than 90 percent. The non-volatile content is a measure of the reaction product's ability to be cured into the coating prior to being volatilized. It is determined by subjecting a known amount of reaction product, i.e., about 0.5 grams, to a temperature of 110° C. for 1 hour. The non-volatile content is the percentage remaining.

Among the co-curing active hydrogen-containing resins which can be used along with the aliphatic diol reaction products of the invention include polyester polyols, acrylic polyols and polyurethane polyols.

Polyester polyols can be prepared by polyesterification of an organic polycarboxylic acid or anhydride thereof with organic polyols and/or an epoxide. Usually the polycarboxylic acids and polyols are aliphatic or aromatic dibasic acids and diols.

The diols which are usually employed in making the polyester include alkylene glycols such as ethylene glycol, neopentyl glycol and other glycols such as cyclohexanedimethanol and caprolactone diol, for example, the reaction product of epsilon-caprolactone and ethylene glycol. Polyols of higher functionality such as trimethylolpropane can also be used. Higher molecular weight polyols such as those produced by oxyalkylating lower molecular weight polyols can also be used.

The acid component of the polyester consists primarily of monomeric carboxylic acids or anhydrides having 2 to 18 carbon atoms per molecule. Among the acids which are useful are phthalic acid, tetrahydrophthalic acid, hexahydrophthalic acid, adipic acid, and azelaic acid. There may also be employed higher polycarboxylic acids such as trimellitic acid. Where acids are referred to above, it is understood that anhydrides of those acids which form anhydrides can be used in place of the acid. Also, lower alkyl esters of the acids such as dimethyl phthalate can be used.

Besides polyester polyols formed from polybasic acids and polyols, polylactone-type polyesters can also be employed. These products are formed from the reaction of a lactone such as epsiloncaprolactone and a polyol. Such products are described in U.S. Pat. No. 3,169,945 to Hostettler.

Besides the polyester polyols, polyurethane polyols can also be used. These polyols can be prepared by reacting the above-mentioned polyester polyols with a minor amount of isocyanate (OH/NCO equivalent ratio greater than 1:1) so that free hydroxyl groups are present in the product. In addition to the high molecular weight polyols mentioned above, mixtures of both high molecular weight and low molecular weight polyols may be used. Among the low molecular weight polyols are diols and triols such as aliphatic polyols including alkylene polyols containing from 2 to 18 carbon atoms. Examples include ethylene glycol, 1,4-butanediol, 1,6-hexanediol, and cyclohexanedimethanol. An example of a triol is trimethylolpropane.

The organic polyisocyanate which is used in preparing the polyurethane polyols can be an aliphatic or an aromatic isocyanate or a mixture of the two. Aliphatic isocyanates provide better color stability in the resultant coating. Diisocyanates are preferred although higher polyisocyanates can be used. Examples of suitable polyisocyanates are 4,4'-diphenylmethane diisocyanate, toluene diisocyanate, 1,6-hexamethylene diisocyanate, isophorone diisocyanate, and 4,4'-methylene-bis-(cyclohexylisocyanate). An example of a higher functionality polyisocyanate is polymethylene polyphenyl isocyanate.

Hydroxyl-containing acrylic polymers or acrylic polyols can also be used as the co-curing active hydrogen-containing polymer. Among the acrylic polyols are interpolymers of about 0.2 to 50 percent by weight hydroxy-containing vinyl monomers such as hydroxyalkyl acrylate and methacrylate having 2 to 6 carbon atoms in the alkyl group and 50 to 99.8 percent by weight of other ethylenically unsaturated copolymerizable materials such as alkyl acrylates and methacrylates, the percentages by weight being based on total weight of monomeric charge.

Examples of suitable hydroxyalkyl acrylates and methacrylates are hydroxyethyl methacrylate and hydroxypropyl acrylate.

Examples of suitable alkyl acrylates and methacrylates are methyl methacrylate, ethyl acrylate, 2-ethylhexyl acrylate and n-butyl acrylate.

Besides acrylates and methacrylates, other copolymerizable monomers which can be copolymerized with the hydroxyalkyl acrylates and methacrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methylstyrene, alpha-methyl chlorostyrene, vinyl butyrate, vinyl acetate, vinyl chloride, and mixtures thereof. Usually these other ethylenically unsaturated materials are used in admixture with the above-mentioned acrylates and methacrylates.

The active hydrogen-containing co-cured resins should have hydroxyl equivalent weights of from about 30 to about 2000, preferably from about 40 to about 1000, and the hydroxyl functionality should be on average at least about 2.

To form a curable composition, the aliphatic diol reaction products by themselves or optionally with the co-curing active hydrogen-containing resins are combined with a crosslinking agent. The crosslinking agent is one which is capable of reacting with the active hydrogens in the aliphatic diol reaction products and the co-curing resin to give a thermoset composition upon curing. Examples of suitable crosslinking agents are aminoplasts and polyisocyanates including blocked polyisocyanates. Aminoplasts are obtained by a condensation reaction of an aldehyde with an amine or an amide. The most common amines or amides are melamine, urea and benzoguanamine. However, condensation with other amines or amides may be employed. While the aldehyde employed is most often formaldehyde, other aldehydes such as acetaldehyde, croton aldehyde, benzaldehyde and furfural may be used. The aminoplast contains methylol or similar alkylol groups and preferably at least a portion of these alkylol groups are etherified by reaction with alcohol to provide organic solvent-soluble resins. Any monohydric alcohol can be employed for this purpose including such alcohols as methanol, ethanol, butanol and hexanol. Preferably, the aminoplasts which are used are melamine, urea or benzoguanamine-formaldehyde condensates etherified with alcohol containing from 1 to 4 carbon atoms such as methanol, ethanol, butanol or mixtures thereof.

Polyisocyanates and blocked polyisocyanates may also be used as curing agents. Examples of suitable polyisocyanates include monomeric polyisocyanates such as toluene diisocyanate and 4,4'-methylene-bis(cyclohexylisocyanate), isophorone diisocyanate and NCO-prepolymers such as the reaction product of monomeric polyisocyanates such as those mentioned above with polyester or polyether polyols.

The polyisocyanate may optionally be blocked. Examples of suitable blocking agents are those materials which would unblock at an elevated temperature such as lower aliphatic alcohols such as methanol, oximes such as methyl ethyl ketoxime, and lactams such as caprolactam. Blocked isocyanates can be used to form stable one-package systems. Polyfunctional isocyanates with free isocyanate groups can be used to form two-package room temperature-curable systems. In these systems, the active hydrogen-containing component (i.e., aliphatic diol reaction product and optional co-curing resin) and the isocyanate curing agent are mixed just prior to application. The amount of polyisocyanate or blocked polyisocyanate curing agent which is used can vary between about 0.2 to 1.5, preferably 0.3 to 1.3 equivalents of NCO per equivalent of active hydrogen in the active hydrogen-containing component.

On a weight basis, the aliphatic diol reaction products are present in the coating composition in amounts of about 10 to 90, preferably 20 to 70 percent by weight; the curing agent is present in amounts of 10 to 70, preferably 30 to 50 percent by weight, and the co-curing active hydrogen-containing resin is present in amounts of 0 to 80, preferably 30 to 50 percent by weight; the percentage by weight being based on total weight of these three resinous ingredients.

The aliphatic diol reaction products, curing agent and optionally the co-curing resins are used in the formulation of high solids coating compositions. The high solids coating compositions preferably contain on a calculated basis greater than 50 percent and more preferably greater than 60 percent by weight non-volatile solids exclusive of pigment, solvents and other non-reactive components.

Besides the polymeric and resinous ingredients mentioned above, the high solids coating composition can optionally contain pigment, liquid diluent, plasticizers, anti-oxidants, UV light absorbers, surfactants, and flow control agents, as is well known in the art.

The coating compositions of the present invention are designed for application by spraying, although other conventional methods of coating including brushing, dipping and flow coating can be employed if desired. Usual spray techniques and equipment can be utilized. The coating compositions can be applied virtually over any substrate including wood, metal, glass, cloth, plastics, foams and the like, as well as over various primers. The coating compositions are useful for a wide variety of applications. They can be used for coating general industrial equipment such as metal tables, chairs and lockers, can be used for coating appliance parts such as refrigerators and washing machines, can be used for coating automobile bodies and truck cabs, and can also be used in coil coating applications.

In general, coating thicknesses will vary depending upon the application desired. In general, coatings from about 0.1 to 5 mils have been found to be useful in most applications.

After application to the substrate, the coatings are cured. Curing is usually conducted at temperatures of about 100°-200° C. and in most cases, the cure schedule is from 10 to 30 minutes at about 130° to 180° C. Higher or lower temperatures with corresponding longer or shorter times can be utilized, although the exact cure schedule best employed depends upon the nature of the substrates as well as the particular components used in formulating the coating compositions. With aminoplast curing agents, acid catalysts can be employed if desired as they usually permit use of lower temperature and/or shorter times for cure.

The invention will be further described by reference to the following examples. Unless otherwise indicated, all parts are by weight.

EXAMPLES

The following examples show the preparation of various reaction products of aliphatic diols having a chain length greater than $C_{10}$ with lactones and alkylene oxides and the use of these reaction products in coating compositions as reactive diluents and as principal resinous binders in combination with curing agents.

EXAMPLE I

An aliphatic diol having an average chain length of $C_{14}$ (SR-100 diol available from Sartomer Company) was reacted with epsiloncaprolactone in the following charge ratio:

| Ingredients | Parts by Weight (grams) | Mole Ratio |
| --- | --- | --- |
| SR-100 diol | 4892.9 | 1 |
| epsilon-caprolactone | 3887.1 | 2 |
| Dibutyltin oxide | 8.78 | |

The ingredients were charged to a reaction flask equipped with a condenser and an inlet for nitrogen and heated under a nitrogen atmosphere at 120° C. until a constant Gardner-Holdt viscosity of J was obtained. The reaction product had a solids content of 97.7 percent, an acid value of 6.7, and a hydroxyl value of 222.7.

EXAMPLE II

SR-100 diol was reacted with propylene oxide in the following charge ratio:

| Ingredients | Parts by Weight (grams) | Mole Ratio |
| --- | --- | --- |
| SR-100 diol | 356.1 | 1 |
| 50% Aqueous potassium hydroxide | 5.0 | |
| Propylene oxide | 143.9 (170 ml) | 2 |

The SR-100 diol and potassium hydroxide were placed in a reaction flask equipped with a dry ice condenser, nitrogen inlet, addition funnel, mechanical stirrer and thermometer. The charge was heated to 120° C. under a nitrogen atmosphere followed by the addition of the propylene oxide dropwise at a rate to maintain a slow reflux at a temperature between 110°-120° C. At the completion of the addition of the propylene oxide, the reaction temperature was maintained at 120° C. until the refluxing stopped.

The potassium hydroxide and water were removed from the reaction mixture by first neutralizing with a mixture of 3.4 grams of 85 percent aqueous phosphoric acid and 7 grams of deionized water which was stirred into the reaction mixture for 15 minutes. The pH of the reaction mixture was 6.5. A solution of 7.1 grams of disodium phosphate in 20 grams of deionized water was stirred into the reaction mixture for 20 minutes, and the reaction mixture vacuum stripped for 30 minutes at 30 millimeters of mercury at 100° C. to remove 30 grams of distillate. The reaction mixture was filtered and the filtrate found to have a solids content of 87 percent, a Gardner-Holdt viscosity of F, and acid value of 0.7 and a hydroxyl value of 348.3.

EXAMPLE III

SR-100 diol was reacted with epsilon-caprolactone and propylene oxide in the following charge ratio:

| Ingredients | Parts by Weight (grams) | Mole Ratio |
| --- | --- | --- |

-continued

| | Charge A | |
|---|---|---|
| SR-100 diol/caprolactone reaction product[1] | 485.6 | ½ |
| 50% Aqueous potassium hydroxide | 6.0 | |
| | Charge B | |
| Propylene oxide | 114.4 | 2 |

| Ingredients | Parts by Weight (grams) |
|---|---|
| | Charge C |
| 85% Aqueous phosphoric acid | 4.1 |
| Deionized water | 8.0 |
| | Charge D |
| Disodium phosphate | 8.5 |
| Deionized water | 24.0 |

[1] ½ mole ratio of SR-100 diol/caprolactone prepared as described in Example I, OH on resin solids equals 228.

Charge A was placed in a reaction flask equipped with a dry ice condenser, thermometer, mechanical stirrer, nitrogen inlet and addition funnel. The charge was heated to 120° C. under a nitrogen blanket to initiate a reflux. The propylene oxide was added dropwise at a rate to maintain a slow reflux between 110°–120° C. After the addition of the propylene oxide was complete, the reaction mixture was held at 120° C. until refluxing stopped.

The pH of the reaction mixture was 12.8. Charge C was stirred into the reaction mixture for 15 minutes to give a pH of 6.7. Charge D was stirred into the reaction mixture for 20 minutes, the reaction mixture vacuum stripped at 30 millimeters of mercury at 100° C. to remove 35.2 grams of distillate. The reaction mixture was cooled and filtered. The solids content of the filtrate was 92 percent, it had a Gardner-Holdt viscosity of I+, an acid value of 1.4 and a hydroxyl number of 190.9.

EXAMPLE IV

The SR-100 diol was reacted first with propylene oxide and then with epsilon-caprolactone in the following charge ratio:

| Ingredients | Parts by Weight (grams) | Mole Ratio |
|---|---|---|
| SR-100 diol/propylene oxide reaction product[1] | 175.7 | ½ |
| Dibutyltin oxide | 0.3 | |
| epsilon-caprolactone | 124.3 | 2 |

[1] ½ molar ratio SR-100 diol/propylene oxide prepared as described in Example II.

The ingredients above were charged to a reaction flask equipped with a reflux condenser, magnetic stirrer and nitrogen inlet. The reactants were heated to 120° C. under a nitrogen blanket and held at this temperature until a constant viscosity of I was obtained. The reaction mixture was then cooled and filtered. The filtrate had a solids content of about 97.1 percent, a Gardner-Holdt viscosity of J, an acid value of 1.1 and a hydroxyl value of 199.1.

Coating Compositions

The reaction products prepared as described above were evaluated along with curing agents as the principal resinous binders in coating compositions and as reactive diluents in coating compositions. The coating compositions were as follows:

EXAMPLE V

The following example shows the evaluation of the reaction product of Example II as a reactive diluent in an acrylic polyolaminoplast curing agent composition.

| Ingredients | Parts by Weight (grams) | Percent by Weight |
|---|---|---|
| Reaction product of Example I | 40.0 | 20 |
| AT-400 (75% solids)[1] | 106.7 | 40 |
| CYMEL 303[2] | 80.0 | 40 |
| 25% para-toluenesulfonic acid in methanol | 8.0 | 1 |
| Methyl amyl ketone | 75.0 | |

[1] Hydroxyl-containing acrylic resin available from Rohm and Haas Company, 75 percent resin solids in 2-ethoxyethylacetate.
[2] Hexakis(methoxymethylol) melamine available from American Cyanamid Company.

The ingredients above were blended together in a can with hand stirring. The resultant coating composition had a solids content of 58.4 percent. When drawn down as a film with a 0.003 Bird applicator on a zinc phosphate pretreated steel panel and baked at 177° C. for 15 minutes, a cured film having a 3H pencil hardness resulted. Fifty (50) double rubs with a xylene-saturated cloth did not mar the surface of the coating.

EXAMPLE VI

The following example shows the evaluation of the reaction product of Example II as a reactive diluent in an acrylic polyolpolyisocyanate curing agent composition.

| Ingredients | Parts by Weight (grams) | Percent by Weight |
|---|---|---|
| Reaction product of Example II | 26.0 | 13 |
| AT-400 (78% solids in methyl amyl ketone) | 1334.4 | 52 |
| DESMODUR N-75[1] | 93.3 | 35 |
| Dibutyltin dilaurate | 0.2 | 1 |
| Xylene | 110.9 | |

[1] Polyfunctional aliphatic isocyanate, available from Mobay Chemical Company, 255 grams/equivalent NCO, 75 percent solids.

The above ingredients were blended together in a can with hand stirring. The coating composition had a resin solids content of about 54.2 percent. When applied to a zinc phosphate pretreated steel panel with a Bird applicator as described in Example I and air dried for 6 hours, the coating had a pencil hardness of 2B. Fifty (50) double rubs with a xylene-saturated cloth marred the film surface slightly. After 24 hours of air drying, the coating had an F pencil hardness.

EXAMPLE VII

The following example shows the evaluation of the reaction product of Example III as the principal resinous binder cured with an aminoplast.

| Ingredients | Parts by Weight (grams) | Percent by Weight |
|---|---|---|
| Reaction product of Example III | 120.0 | 60 |

-continued

| Ingredients | Parts by Weight (grams) | Percent by Weight |
|---|---|---|
| CYMEL 303 | 80.0 | 40 |
| 25% para-toluenesulfonic acid in methanol | 8.0 | 1 |
| Methyl amyl ketone | 44.0 | |

The ingredients were blended together as described above in Example V. When applied and cured over a zinc phosphate preteated steel substrate as described in Example V, the cured film had an H pencil hardness. Fifty (50) double rubs with an acetone-saturated cloth did not mar the surface of the coating.

EXAMPLE VIII

The following example shows the evaluation of the reaction product of Example IV as the principal resinous binder in a coating composition along with a polyisocyanate curing agent. The coating was formed from the following mixture of ingredients:

| Ingredients | Parts by Weight (grams) | Percent by Weight |
|---|---|---|
| Reaction product of Example IV | 114.8 | 57.4 |
| DESMODUR N-75 | 113.6 | 42.6 |
| Dibutyltin dilaurate | 0.2 | 1 |
| Xylene | 104.9 | |

The ingredients were blended together as described in Example VII. The coating composition had a theoretical resin solids content of 60 percent.

When applied to a zinc phosphate pretreated steel substrate as described in Example VI and air dried for 6 hours, the coating had a pencil hardness of 2B. Fifty (50) acetone double rubs with a xylene-saturated cloth marred the film surface slightly. After 24 hours of air drying, the coating had an F pencil hardness.

We claim:

1. A coating composition comprising:
   (a) 10 to 90 percent by weight of the reaction product of an apliphatic diol having a hydrocarbon chain length between hydroxyls of greater than $C_{10}$ and a reactant selected from the class consisting of lactones, epoxides and mixtures thereof;
   (b) 10 to 70 percent by weight of a crosslinking agent capable of reacting with the active hydrogens in the aliphatic diol to give a thermoset composition upon curing.

2. The coating composition of claim 1 in which the reaction product is present as a reactive diluent along with a co-curing active hydrogen-containing resin in the coating composition.

3. The coating composition of claim 1 in which the aliphatic diol has an average chain length of $C_{14}$.

4. The coating composition of claim 1 in which the lactone is caprolactone.

5. The coating composition of claim 1 in which the epoxide is an alkylene oxide.

6. The coating composition of claim 5 in which the alkylene oxide is selected from the class consisting of ethylene oxide, propylene oxide and mixtures thereof.

7. The coating composition of claim 1 in which the aliphatic diol is reacted with both a lactone and an epoxide.

8. The coating composition of claim 3 in which the aliphatic diol is reacted with caprolactone.

9. The coating composition of claim 3 in which the aliphatic diol is reacted with an alkylene oxide selected from the class consisting of ethylene oxide, propylene oxide and mixtures thereof.

10. The coating composition of claim 3 in which the aliphatic diol is reacted with both a lactone and a monoepoxide.

11. The coating composition of claim 1 in which the mole ratio of aliphatic diol to lactone or monoepoxide is about 1:2 to 10.

12. The coating composition of claim 8 in which the mole ratio of aliphatic diol to lactone or monoepoxide is about 1 to 2.

13. A coating composition comprising:
   (a) 10 to 90 percent by weight of the reaction product of an aliphatic diol having a hydrocarbon chain length between hydroxyls of greater than $C_{10}$ and an alkylene oxide selected from the class consisting of ethylene oxide, propylene oxide and mixtures thereof;
   (b) 10 to 70 percent by weight of a crosslinking agent capable of reacting with the active hydrogens of the aliphatic diol to give a thermoset composition upon curing.

* * * * *